US006164492A

United States Patent [19]

Lane et al.

[11] Patent Number: 6,164,492

[45] Date of Patent: Dec. 26, 2000

[54] READILY DEFORMABLE PRESSURE SYSTEM FOR DISPENSING FLUID FROM A CONTAINER

[75] Inventors: Michael L. Lane; Lowell T. Whitney, both of Arvada, Colo.

[73] Assignee: Quoin Industrial, Inc., Golden, Colo.

[21] Appl. No.: 09/334,737

[22] Filed: Jun. 17, 1999

Related U.S. Application Data

[60] Provisional application No. 60/130,010, Apr. 19, 1999, and provisional application No. 60/138,856, Jun. 11, 1999.

[51] Int. Cl.[7] .......... G01F 11/00

[52] U.S. Cl. .......... 222/1; 222/386.5; 222/394

[58] Field of Search .......... 222/386.5, 394, 222/399, 94; 206/219

[56] References Cited

U.S. PATENT DOCUMENTS

| | | | |
|---|---|---|---|
| 2,932,385 | 4/1960 | Bollmeier et al. | 206/47 |
| 3,095,291 | 6/1963 | Robbins | 62/4 |
| 3,178,075 | 4/1965 | Riedl et al. | 222/386.5 |
| 3,182,728 | 5/1965 | Zabriskie | 169/32 |
| 3,189,231 | 6/1965 | Kibbel, Jr. et al. | 222/389 |
| 3,239,105 | 3/1966 | Woodson | 222/94 |
| 3,718,236 | 2/1973 | Reyner et al. | 222/386.5 |
| 3,756,389 | 9/1973 | Firth | 206/47 A |
| 4,049,158 | 9/1977 | Lo et al. | 222/95 |
| 4,067,479 | 1/1978 | Moline | 222/94 |
| 4,190,734 | 2/1980 | Dressler, Jr. | 174/38 |
| 4,251,032 | 2/1981 | Werding | 239/323 |
| 4,295,582 | 10/1981 | Acres | 222/386.5 |
| 4,360,131 | 11/1982 | Reyner | 222/386.5 |
| 4,373,341 | 2/1983 | Mahaffy et al. | 60/721 |
| 4,376,500 | 3/1983 | Banks et al. | 222/386.5 |
| 4,458,811 | 7/1984 | Wilkinson | 206/219 |
| 4,478,044 | 10/1984 | Magid | 60/721 |
| 4,491,250 | 1/1985 | Liebermann | 222/386.5 |
| 4,513,884 | 4/1985 | Magid | 222/94 |
| 4,674,532 | 6/1987 | Koyanagi | 137/512.15 |
| 4,679,706 | 7/1987 | Magid et al. | 222/130 |
| 4,708,167 | 11/1987 | Koyanagi | 137/512.15 |
| 4,785,972 | 11/1988 | LeFevre | 222/386.5 |
| 4,823,985 | 4/1989 | Grollier et al. | 222/1 |
| 4,842,007 | 6/1989 | Kurtz | 137/223 |
| 4,917,646 | 4/1990 | Kieves | 446/224 |
| 4,919,310 | 4/1990 | Young et al. | 222/386.5 |
| 4,923,095 | 5/1990 | Dorfman et al. | 222/386.5 |
| 4,964,540 | 10/1990 | Katz | 222/386.5 |
| 5,188,558 | 2/1993 | Barton et al. | 446/224 |
| 5,333,763 | 8/1994 | Lane et al. | 222/386.5 |
| 5,492,219 | 2/1996 | Stupar | 206/219 |
| 5,526,957 | 6/1996 | Brown et al. | 222/94 |
| 5,769,282 | 6/1998 | Lane et al. | 222/386.5 |

FOREIGN PATENT DOCUMENTS

| | | | |
|---|---|---|---|
| 246013 | 3/1966 | Austria | 222/386.5 |

*Primary Examiner*—Joseph A. Kaufman
*Attorney, Agent, or Firm*—Klaas, Law, O'Meara & Malkin, P.C.; Michael A. Goodwin, Esq.

[57] ABSTRACT

Disclosed is a multi-compartment pressure pouch for use in a container pressure generation system. The outer sheets of the pressure pouch are formed from a relatively highly deformable material, so that the pressure pouch may conform to the interior of a container having virtually any shape. The highly deformable material may be chosen such that its yield strength is greater than the force required to open each pouch compartment. In this manner, it is ensured that all of the compartments will open before the highly deformable material begins plastic deformation. The pressure pouch may further include one or more flow channels formed therewith to ensure fluid communication between all parts of the dispensing container.

21 Claims, 8 Drawing Sheets

READILY DEFORMABLE PRESSURE SYSTEM FOR DISPENSING FLUID FROM A CONTAINER

This application claims the benefit of U.S. Provisional Application No. 60/130,010, filed Apr. 19, 1999, now abandoned, and U.S. Provisional Application No. 60/138,856, filed Jun. 11, 1999, now abandoned for READILY DEFORMABLE PRESSURE SYSTEM FOR DISPENSING FLUID FROM A CONTAINER of Michael L. Lane and Lowell T. Whitney, both of which are hereby incorporated by reference for all that is disclosed therein.

FIELD OF THE INVENTION

The present invention relates generally to self pressurized dispensing devices and methods and, more particularly, to a pressure generating system for use in such dispensing devices.

BACKGROUND OF THE INVENTION

Flowable materials are commonly dispensed from pressurized containers. In many such containers, a gaseous propellent is mixed with the flowable material product, thus providing the motive force to expel the product from the container. One example of such a container is an aerosol can in which a propellant gas is provided to drive a liquid or an atomized gas-liquid mixture product from the container. In such containers, the initial pressure within the container often declines as the product is dispensed.

Although this type of pressurization system works adequately with some products, in many applications it is undesirable to mix the propellant gas with the product being dispensed. Such mixing may result in undesirable reactions between the product and the propellant, thus leading to a degradation of the product.

It is also undesirable to dispense many products with a declining pressure dispensing system. This is particularly true with carbonated liquid products, such as beer. It has been found that successfully dispensing carbonated liquids depends, in part, upon maintaining a predetermined relatively constant pressure differential between the inside of the container and the ambient environment. In a declining pressure dispensing system, this is generally not possible.

To overcome the problems discussed above, one pressurization system has been developed in which an expansible pressure pouch is placed within the product container. The pressure pouch includes a plurality of chemicals contained in a series of compartments within the pouch. When mixed together, the chemicals in the pouch generate gas and pressure, thus expanding the pouch and providing pressure to drive the product from the container. As product is dispensed from the container, the pouch expands, causing more compartments to open. This, in turn, causes the introduction and mixing of more gas-generating chemicals and, thus, the development of more pressure within the container. The expansible pouch, thus provides the dual functions of separating the propellant gas from the product and of maintaining a relatively constant pressure profile within the container.

Expansible pressure pouches may be formed by juxtaposing two sheets of flexible plastic material. The pouch compartments discussed above may be formed by releasably attaching one sheet to the other at selected seam locations, e.g., via a heat sealing technique. As the pouch expands, each releasable seam may be opened or peeled in a sequential manner to release more gas-generating chemical in a manner as described above. Examples of such expansible pressure pouches using peelable seam technology are disclosed in U.S. Pat. No. 4,785,972 to LeFevre; U.S. Pat. No. 4,919,310 to Young et al.; U.S. Pat. No. 4,923,095 to Dorfman et al. and U.S. Pat. No. 5,333,763 to Lane et al., which are all hereby specifically incorporated by reference for all that is disclosed therein.

As an alternative to peelable seams, the compartments of some pressure pouches are separated by frangible wall portions which fail or tear in response to increasing volume of an adjacent compartment. Examples of pressure pouches using such frangible divider wall portions are disclosed in U.S. Pat. No. 5,769,282 to Lane et al. which is hereby specifically incorporated by reference for all that is disclosed therein.

During typical operation of a pressure pouch dispensing system, the pressure pouch is first inserted into a dispensing container which is adapted to contain a flowable material product to be dispensed. After the container is sealed, the pouch is activated, thus applying pressure to the product in the container. This pressure is used to force product from the container when it is desired to dispense product from the container. As product is dispensed from the container, the pouch continues to expand.

As can be appreciated, in order to completely expend all of the product from the container, the pouch must fully expand such that it contacts the entire interior of the container. This is readily achievable in cases where the ends of the container are substantially curved, as in containers disclosed, for example, in U.S. Pat. Nos. 4,785,972; 4,919,310; 4,923,095 and 5,333,763, previously referenced. It has been found, however, that the use of pressure pouches, as described above, is problematic in containers having irregular, e.g., non curved, end portions. Specifically, it has been found that a pressure pouch will often fail to conform to the interior of a container in a non-curved area and a gap, thus, will be created between the pouch and the container wall. The product contained in this gap, thus, cannot be dispensed from the container. In some cases, the inability of the pouch to conform to the interior of the container will also cause the pouch to rupture, thus releasing the gas generating chemicals into the product to be dispensed in an undesirable manner. In either case, a portion of the product within the container cannot be dispensed due to the inability of the pouch to conform to the interior of the container.

This situation has sometimes been addressed in the past by providing a pouch having dimensions larger than that of the product container. In this manner, the pouch contains extra material which can unfold into the otherwise inaccessible areas of the container. This solution, however, has also been found to be problematic. Specifically, it has been found that, in many cases, the extra material of the larger pouch fails to unfold and, instead, becomes trapped by the expanding pouch itself. Accordingly, the larger pouch often fails to unfold and enter the inaccessible areas. Further, in order to insert such a larger pouch into a container, the larger pouch must generally be folded more times than a smaller pouch. Folds in a pressure pouch tend to be problematic in that they sometimes prevent or interfere with the proper mixing of the reactive components within the pouch. Accordingly, the fact that a larger pouch requires more folds than a smaller pouch tends to add to the problems associated with larger pouches. In addition, larger pouches tend to be more expensive to manufacture due to the increased material contained therein.

Thus, it would be generally desirable to provide an apparatus and method which overcomes these problems associated with flowable product dispensing pressure pouches.

SUMMARY OF THE INVENTION

The present invention is directed to an improved readily deformable pressure pouch for use in a container pressure generation system. The pressure pouch may be of the type having a plurality of compartments containing reactive components of an at least two component gas generation system. The compartments may be sequentially opened to provide additional reactive component as product is dispensed from the container.

The outer sheets of the pressure pouch are formed from a relatively highly deformable material, so that the pressure pouch may conform to the interior of a container having virtually any shape. This may be accomplished as the highly deformable material undergoes plastic deformation.

The highly deformable material may be chosen such that its yield strength is greater than the force required to open each pouch compartment. In this manner, it is ensured that all of the compartments will open before the highly deformable material begins plastic deformation.

The pressure pouch may further include one or more flow channels formed therewith to ensure fluid communication between all parts of the dispensing container.

DETAILED DESCRIPTION OF THE INVENTION

Figure 1:
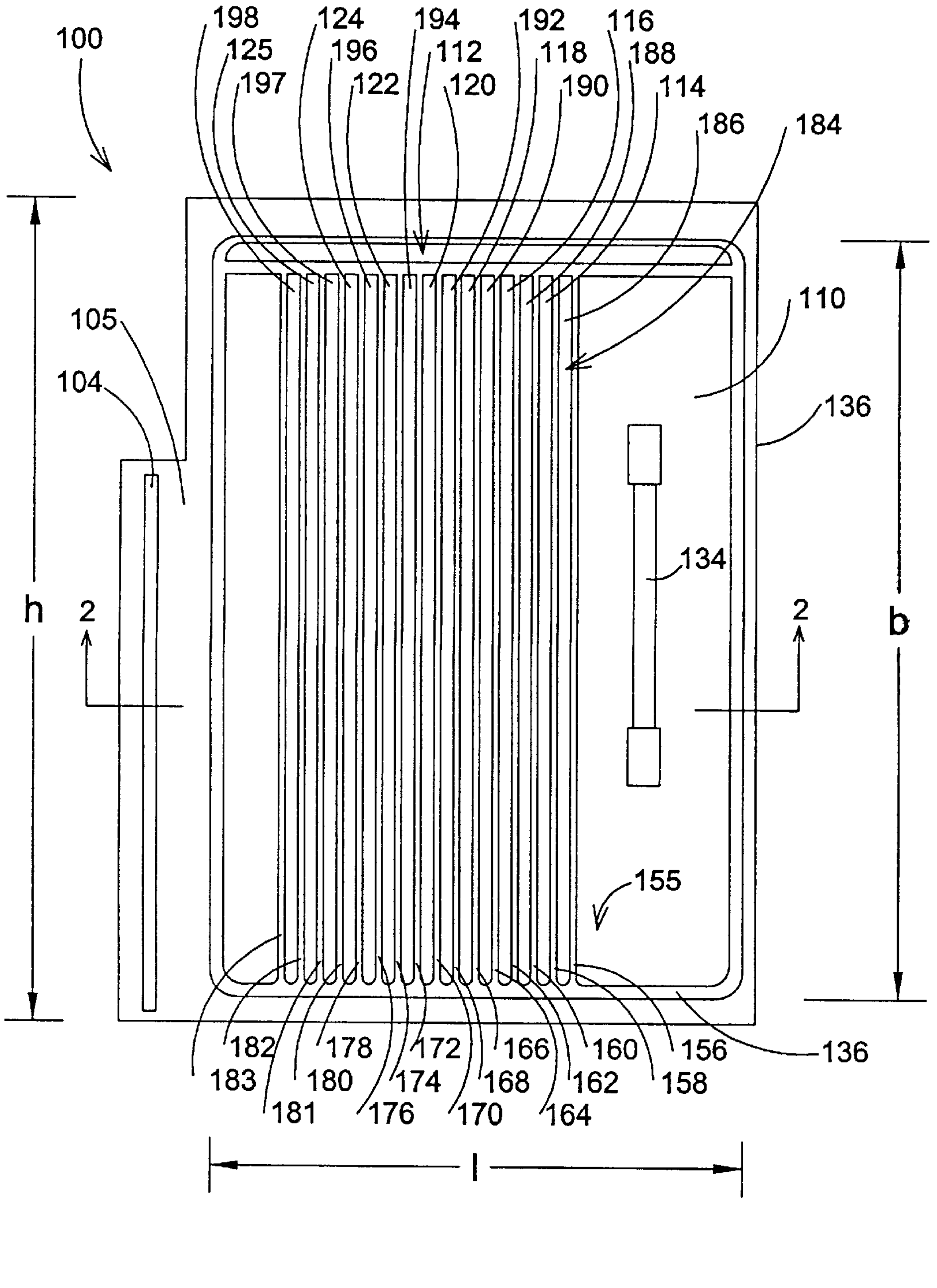
FIG. 1 is a top plan view of a pressure pouch having frangible divider walls and readily deformable outer sheets, shown in a collapsed configuration.

FIGS. 1–10 generally illustrate a pressure pouch 100 suited for use with a dispensing container 500. The pressure pouch includes at least one sheet 138, 144 formed from a first flexible material. The first flexible material is capable of elongating in response to tensile force applied thereto. In response to applied tensile force, the first flexible material reaches a first flexible material ultimate elongation 582 at which point the first flexible material fails. The first flexible material ultimate elongation 582 is at least about 200%.

FIGS. 1–10 further illustrate, in general, a method of dispensing fluid 510 from a container 500 by applying pressure to the fluid 510 with a pressure pouch 100 disposed within the container 500. The pressure pouch 100 has a plurality of compartments 110, 112 therewithin. The method may include establishing fluid communication between the plurality of compartments 110, 112 as the fluid 510 is dispensed from the container 500 and plastically expanding the pressure pouch 100 after all of the plurality of compartments 110, 112 are in fluid communication with each other.

Having thus described the pressure pouch and method in general, they will now be described in further detail.

Figure 2:
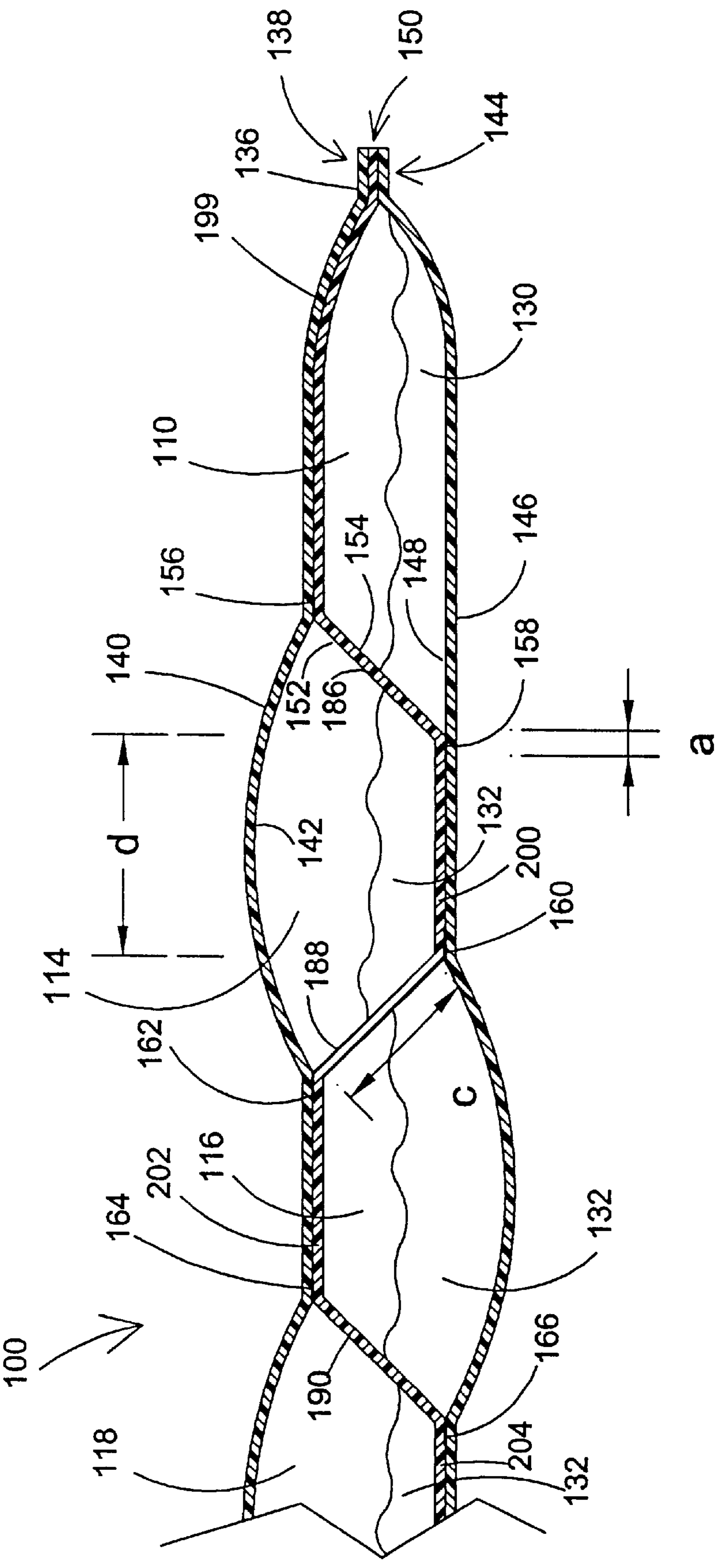
FIG. 2 is a cut-away cross-sectional view of the pressure pouch of FIG. 1 taken along the line 2—2 of FIG. 1.

FIGS. 1 and 2 illustrate a pouch 100 which may include a series of compartments containing components of an at least two-component gas generating system. Specifically, the pouch 100 may have a relatively large first compartment 110 and a plurality of secondary compartments 112, such as the secondary compartments 114, 116, 118, 120, 122, 124, 125 and 126 as shown. First compartment 110 may contain a quantity 130 of a first component of a two-component gas generating system, FIG. 2. The secondary compartments 112 may each contain a quantity 132 of the second component of the two component gas generating system. A triggering device 134, FIG. 1, located in the compartment 110, may contain a quantity of the second component of the two-component gas generating system. The triggering device 134 and components 130, 132 may be of the type disclosed in U.S. Pat. Nos. 4,919,310 or 5,333,763, previously referenced, or may be of any other conventional type.

It is noted that, although FIG. 1 shows the pouch 100 in its completed configuration, the quantities 130, 132 of the gas generating components which would ordinarily be contained in the compartments 110 and 112 have been omitted for illustration purposes. The pouch 100 is illustrated in FIG. 1 in a collapsed configuration in which the compartments 110, 112 are empty. It is to be understood, however, that normally, the completed pouch 100 would contain quantities 130, 132 of the gas generating components as described above.

Referring to FIG. 2, it can be seen that the pouch 100 may be constructed of a first outer sheet 138, a second outer sheet 144 and an intermediate sheet 150. First outer sheet 138 may have an outer surface 140 and an inner surface 142. Second outer sheet 144 may have an outer surface 146 and an inner surface 148. Intermediate sheet 150 may have a first surface 152 and a second surface 154. The periphery 136 of the pouch 100 may be formed in a conventional manner by forming a permanent heat seam between the three layers 138, 150, 144.

Referring again to FIG. 1, intermediate sheet 150 is also connected to the outer sheets 138, 144 at a plurality of connection sites 155, such as the individual connection sites 156, 158, 160, 162, 164, 166, 168, 170, 172, 174, 176, 178, 180, 181, 182 and 183. As best seen in FIG. 2, however, the intermediate sheet 150 is only connected to one of the outer sheets 138 or 144 at each connection site 155. Specifically, with reference to FIG. 1, at the connection sites 156, 162, 164, 170, 172, 178, 180 and 183, the intermediate sheet 150 is connected only to the first outer sheet 138 and, at the connection sites 158, 160, 166, 168, 174, 176, 181 and 182 the intermediate sheet 150 is connected only to the second outer sheet 144.

In this manner, the intermediate sheet 150 may form a plurality of frangible divider sections 184, such as the individual frangible divider sections 186, 188, 190, 192, 194, 196, 197 and 198, FIG. 1, which divide the pouch 100 into the compartments 110, 112 as previously described. With reference to FIG. 2, it can be seen, for example, that the divider section 186 separates the compartment 110 from the compartment 114 and, thus, prevents mixing of the first component 130, located in the compartment 110, with the second component 132 located in the compartment 114. In a similar manner, the divider section 188 separates the compartment 114 from the compartment 116, the divider section 190 separates the compartment 116 from the compartment 118, and so on.

The divider sections 184 are frangible in the sense that they fail or tear when the internal strength of the material forming intermediate sheet 150 is exceeded. Each divider section may, thus, be formed from a continuous, integrally-formed section of the sheet 150. Each section remains intact in its continuous, integral configuration until sufficient force is generated to cause failure of the material forming intermediate sheet 150 and the particular divider section.

Each of the connection sites 155 comprises an area where the intermediate sheet 150 is bonded to either the first outer sheet 138 or second outer sheet 144. Specifically, at the connection sites 156, 162, 164, 170, 172, 178, 180 and 183, the first surface 152 of intermediate sheet 150 is bonded to the inner surface 142 of first outer sheet 138. Similarly, at the connection sites 158, 160, 166, 168, 174, 176, 181 and 182, the second surface 154 of intermediate sheet 150 is bonded to the inner surface 148 of second outer sheet 144.

Referring again to FIG. 2, it can be seen that an unattached section 200 of intermediate sheet 150 may be left between the connection sites 158 and 160. This unattached section of intermediate sheet 150 is not bonded to either of the outer sheets 138, 144. In a similar manner, an unattached section 199 may be left between the connection 156 and the pouch peripheral seam 136, an unattached section 202 may be left between the connections 162 and 164, an unattached section 204 may be left between the connections 166 and 168, and so on.

Pouch 100 may, for example, have an overall height "h" of about 15 inches and an overall length "l" of about 10 inches, FIG. 1, as defined by the periphery 136. The connections 155 and compartments 112 defined thereby may have a height "b" of about 14 inches. The distance "d" from the outside of one connection site to the outside of the same connection site on the same sheet, may be about 0.5 inch, FIG. 2. Each of the connection sites 155 may have a width "a" of about 0.125 inch, FIG. 2. A pouch having dimensions as set forth above might be used, for example, in combination with a dispensing container having a volume of about 5 liters. It is to be understood, however, that the pouch dimensions may readily be altered in order to accommodate other dispensing container sizes and configurations.

The frangible divider sections 184 and compartments 110, 112 of the pouch 100, as described above, may be formed in a substantially identical manner to that disclosed in U.S. Pat. No. 5,769,282, previously referenced.

In operation, the pouch 100 is first typically inserted into a dispensing container containing a flowable material product in a conventional manner. After the container is sealed, the pouch triggering device 134 is activated, causing introduction of the second reactive component housed within the triggering device 134 to mix with the quantity 130 of first reactive component located in the compartment 110. The mixture of the first and second reactive components in this manner causes the generation of gas which, in turn, pressurizes the compartment 110 and the container. This pressure is used to force product from the container when it is desired to dispense product from the container.

As product is dispensed from the container, the volume of the compartment 110 increases. As can be appreciated with respect to FIG. 2, this increase in volume places the frangible divider section 186 in tension. As the volume of compartment 110 continues to increase, upon additional dispensing of product from the container, the tension in the frangible divider section 186 continues to increase until the divider section 186 fails.

Figure 3:
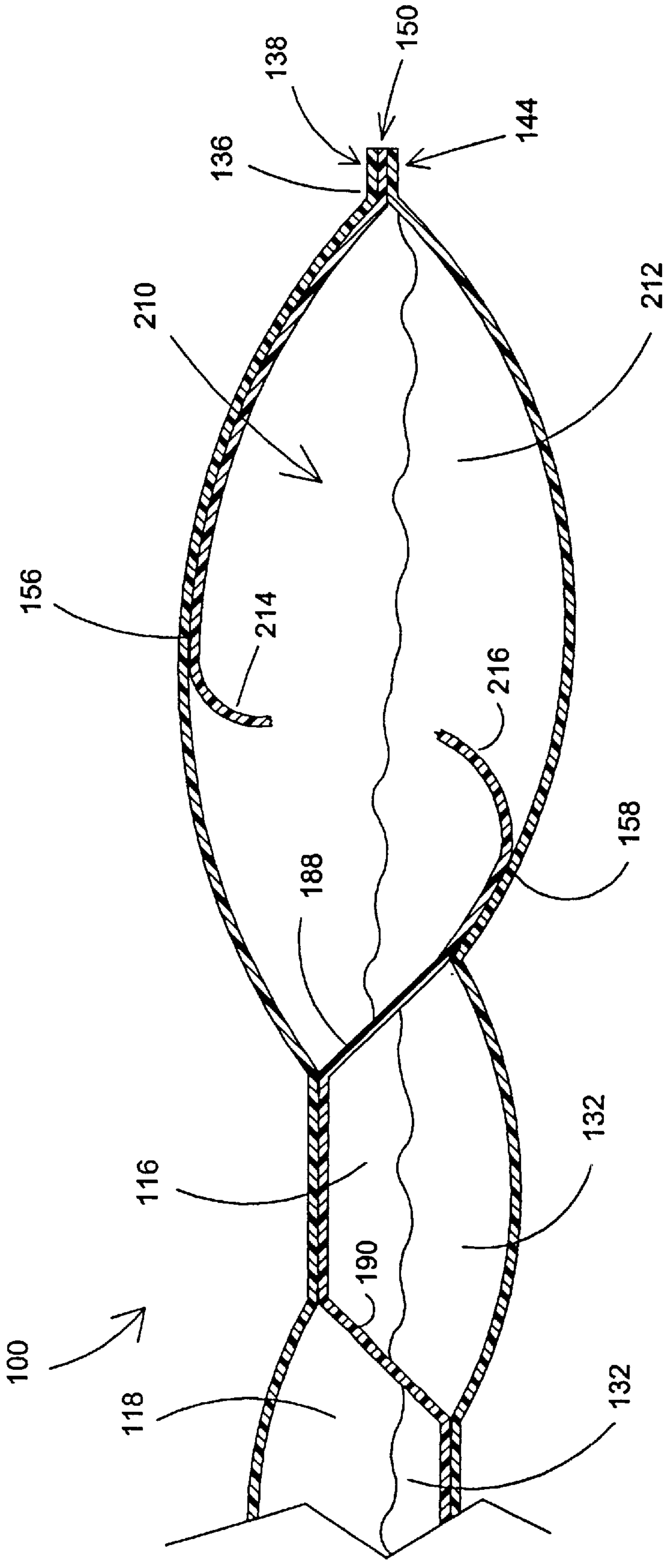
FIG. 3 is a view similar to FIG. 2 showing the pressure pouch of FIG. 1 in a partially activated state.

FIG. 3 illustrates a portion of the pouch 100 after the first frangible divider section 186 has failed. As can be seen, a new compartment 210 has been formed which includes both of the original compartments 110 and 114. As can further be seen from FIG. 3, the frangible wall portion 186, FIG. 2, has separated into two segments 214, 216. First segment 214 remains attached to first outer sheet 138 by the connection 156 and second segment 216 remains attached to second outer sheet 144 by the connection 158.

New compartment 210 contains a mixture 212 of first component 130 previously contained in the first compartment 110 and the quantity 132 of second component previously contained in the secondary compartment 114. Mixing the first and second components in this manner causes more gas and pressure to be generated within the new compartment 210. As can be appreciated, as further product is dispensed, the volume of the new compartment 210 will increase, thus placing the frangible divider section 188 in increasing tension until it fails and allows the quantity 132 of second component located in secondary compartment 116 to mix with the quantity 212. This process continues with the frangible divider sections 190, 192, 194, 196 and 198 sequentially failing as more product is dispensed from the container.

Figure 4:
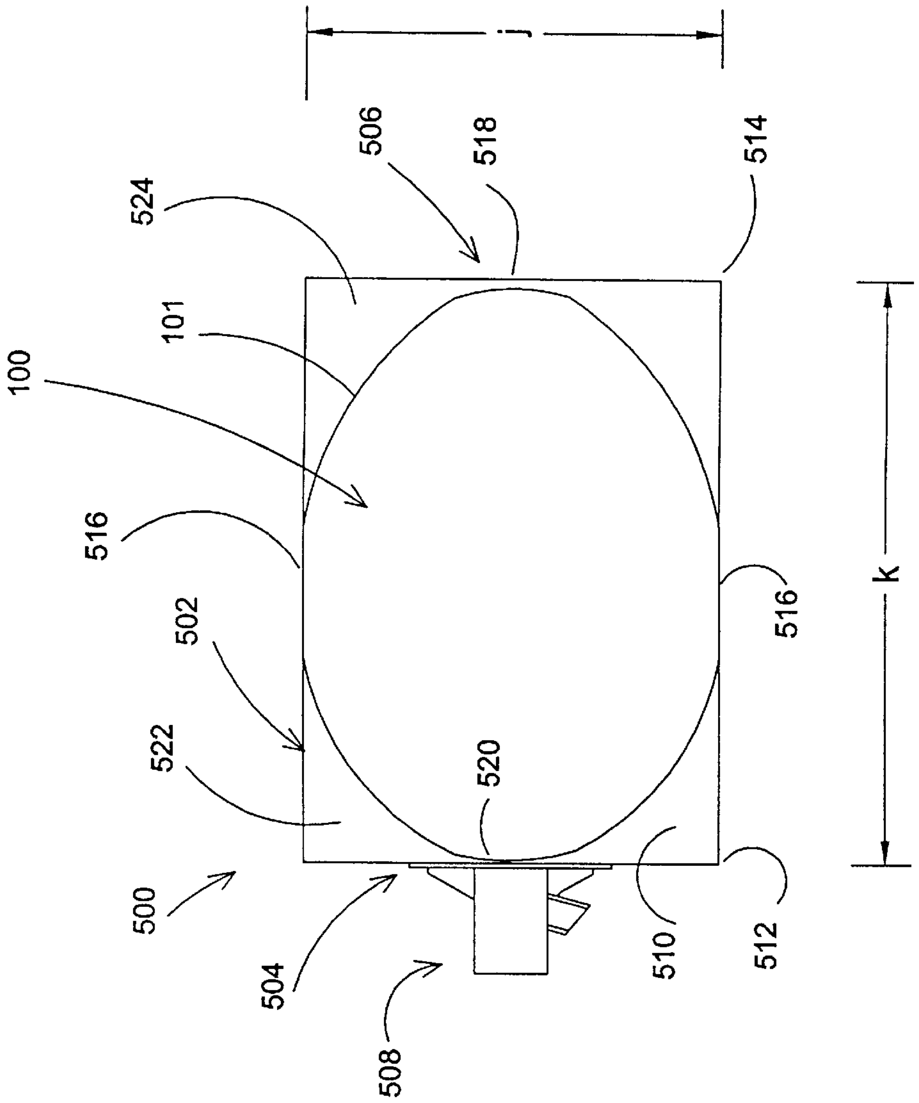
FIG. 4 is a schematic cross-sectional elevation view of the pressure pouch of FIG. 1 inflated within a dispensing container.

FIG. 4 schematically illustrates the pouch 100 inserted within a container 500 after all of the frangible divider sections 184 of the pouch 100 have been ruptured. The container 500 may, for example, be formed from a metallic material and may include a generally cylindrical sidewall portion 502. Sidewall portion 502 may be closed at either end by a top wall portion 504 and a bottom wall portion 506. Top and bottom wall portions 504, 506 may, for example, be attached to the sidewall portion 502 via any conventional manner, such as welding or seaming. A valve member 508 may be attached to the top wall portion 504 to allow fluid 510 to be dispensed from the container 500 in a conventional manner. Container 500 may, for example, have a diameter "j" of about 6.5 inches and a height "k" of about 9.5 inches.

As can be seen with reference to FIG. 4, the sidewall 502 forms a relatively sharp angle with the top wall 504 at the corner 512. In a similar manner, the sidewall 502 forms a relatively sharp angle with the bottom wall 506 at the corner 514. This is in contrast to previous containers used in conjunction with pressure pouches, e.g., the containers disclosed in U.S. Pat. Nos. 4,785,972; 4,919,310; 4,923,095 and 5,333,763, previously referenced, which have smooth, curved profiles.

FIG. 4 illustrates the pouch 100 in a substantially fully inflated condition. As can be seen from FIG. 4, in this condition, the pouch has assumed a generally curved outer profile 101. Further, the pouch 100 may contact the container sidewall 502 in a substantially annular contact area 516. The pouch may also contact the top wall 504 at a contact area 520 and the bottom wall 506 at a contact area 518 as shown. As can be appreciated, the contact areas 516, 518, 520 define a pair of generally annularly extending spaces 522, 524 located between the pouch 100 and the container 500. These spaces are filled with the fluid 510 to be dispensed from the container 500.

As previously described, in order to completely expend all of the fluid 510 from the container 500, the pouch 100 must fully expand such that it contacts the entire interior of the container 500. This is readily achievable in cases where the ends of the container have a substantially curved profile, e.g. the containers disclosed in U.S. Pat. Nos. 4,785,972; 4,919,310; 4,923,095 and 5,333,763, previously referenced. In a container lacking such a curved profile (such as the container 500, FIG. 4), however, prior pouches have been unable to effectively conform to the shape of the container.

Referring again to FIG. 4, for example, conventional pressure pouches are generally not able to expand beyond the extent illustrated in FIG. 4 and, thus, cannot conform to the shape of the interior of the container. Accordingly, the fluid 510 trapped within the areas 522, 524 cannot be expelled from the container 500. In some cases, the inability of the pouch to conform to the interior of the container will cause the pouch to rupture, thus releasing the gas generating chemicals into the fluid 510 in an undesirable manner.

In either case, a portion of the product within the container cannot be dispensed due to the inability of a conventional pouch to conform to the interior of the container.

As will be described in further detail herein, the improved pouch 100 is advantageously modified to allow it to conform to the shape of a container having non-curved end portions, e.g., the container 500 illustrated in FIG. 4. Specifically, with reference to FIG. 5, the pouch 100 is able to deform beyond the state shown in FIG. 4, such that the outer profile 101 of the pouch 100 closely conforms to the shape of the walls of the container 500. In this manner, the spaces 522, 524, previously described, are eliminated and virtually all of the fluid 510 may be expelled from the container 500.

Figure 6:
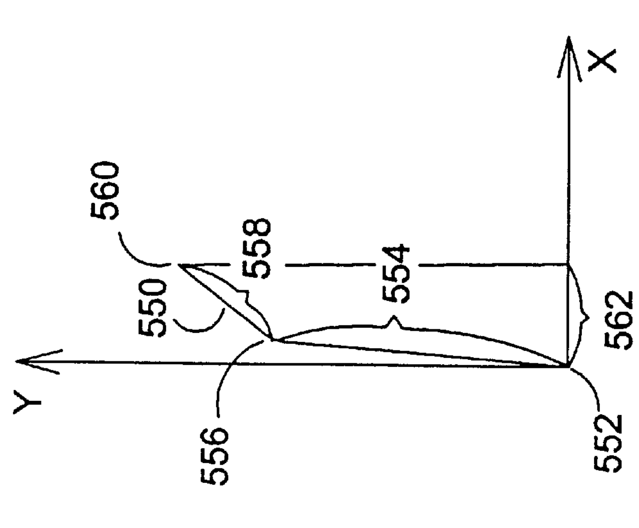
FIG. 6 is a graphical illustration depicting a force-strain diagram for a typical pouch outer wall material.

To enable the pouch 100 to conform to the shape of a non-curved container, first and second outer sheets 138, 144, e.g., FIG. 2, may be formed from a material which is readily deformable. FIG. 6 is a force-strain diagram for a conventional material used for pressure pouch outer sheets, e.g., the material disclosed for this purpose in U.S. Pat. No. 5,769,282, previously referenced. Specifically, the material used to generate the diagram of FIG. 6 was a laminated structure consisting of a PVDC coated PET layer and a PE layer, the structure having a total thickness of about 0.004 inch. To generate the diagram of FIG. 6, a one inch wide strip of the material was placed in the clamps of a conventional tensile testing machine used for testing the strength of materials. The initial gap between the clamps was about 0.375 inch. The clamps were then moved apart at a rate of approximately 12 inches per minute.

In the diagram of FIG. 6, strain is measured on the x-axis as a percentage (i.e., increase in length relative to the initial length of the sample) and force is measured on the y-axis, in a conventional manner. Referring to FIG. 6, the line 550 graphically illustrates the elongation of the typical material in response to the tensile force applied. Specifically, at the point 552, zero force is applied and zero elongation is exhibited. As force is applied to the material, it begins to deform (i.e., lengthen) through an elastic deformation range 554 until the yield point 556 is reached. As force is applied beyond the yield point 556, the material continues to deform through a plastic deformation range 558 until the failure point 560 is reached. The failure point 560 represents the force at which the material will completely fail (i.e., rupture or tear). The failure point 560 also represents the ultimate elongation 562 capable of being achieved by the particular material. This ultimate elongation 562 includes elongation which occurs both during the elastic range 554 and during the plastic range 558.

For the typical pouch outer sheet material described above, the force-strain testing described above indicates that the yield point 556 occurs at a force of about 13 lbs. and an elongation of less than 5%. The failure point 560 occurs at a force of about 19.5 lbs. and an elongation of about 100%. The ultimate elongation 562 is, thus, also about 100%.

It has been found that, due to the relative stiffness of the typical pouch material described above, a pressure pouch constructed using this material is unable to expand beyond the general configuration shown in FIG. 4. Accordingly, a pouch so constructed is unable to expand into the spaces 522, 524 and, thus, cannot force all of the fluid 510 out of the container. It has further been found that pressure pouches constructed of the typical material often rupture if the pressure within the pouch becomes too high relative to the pressure of the fluid 510 outside of the pouch.

Figure 5:
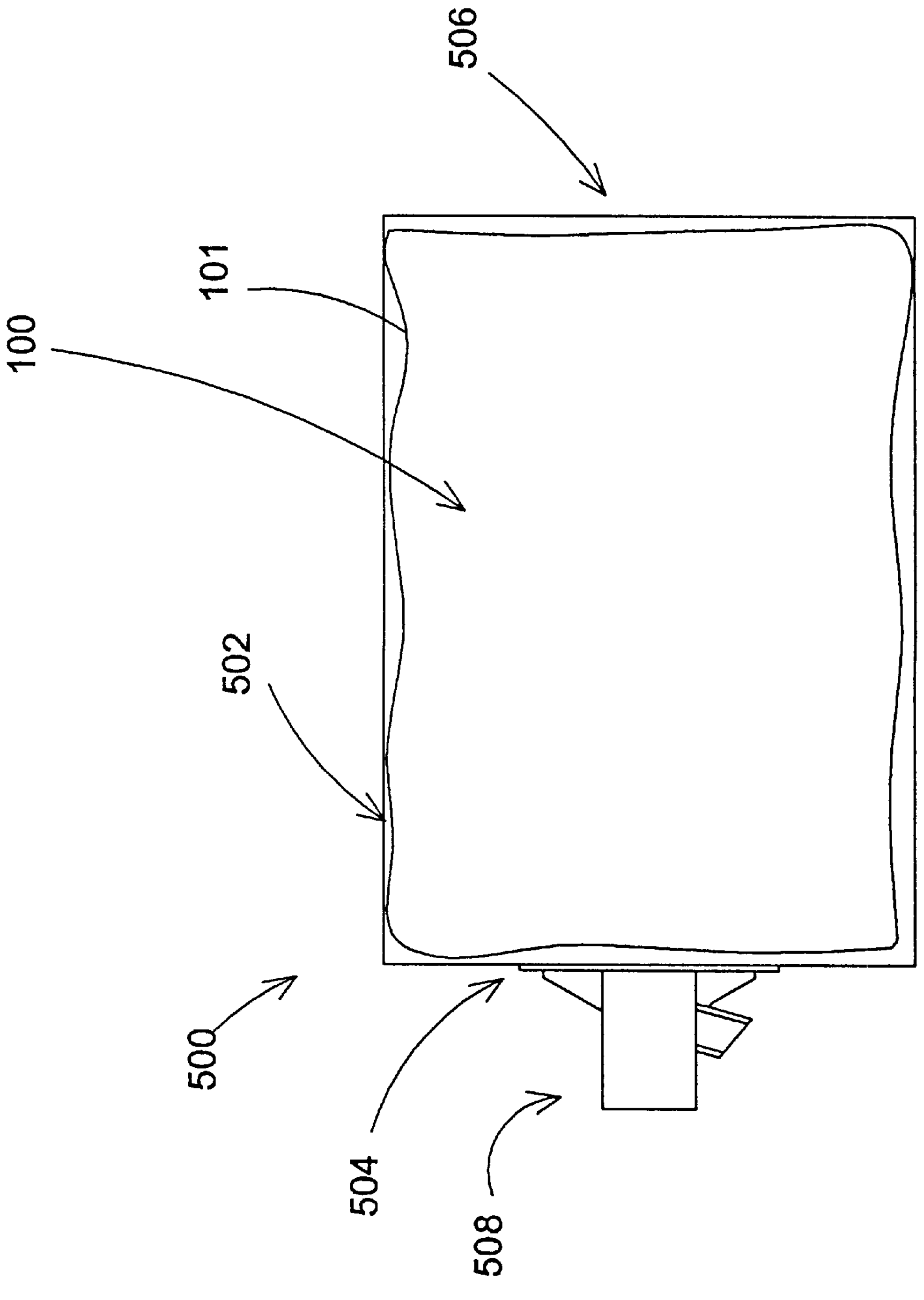
FIG. 5 is view similar to FIG. 4 but illustrating the pouch in a deformed configuration in which it closely conforms to the interior of the container.

The improved pressure pouch 100, however, has been found to function in an improved manner. Specifically, the improved pressure pouch 100 is able to conform closely to the interior of the container 500, as shown in FIG. 5. To accomplish this, the outer sheets 138, 144, FIG. 2, of the pressure pouch 100 may be constructed from a material which is readily deformable. One example of such a readily deformable material, which has been found to work well, is a material which is commercially available from American Plastics Company of Rhinelander, Wis., U.S.A. and sold as product designation UYU10-300. This material is a co-extruded film of (listed in order from the outer surface 146 to the inner surface 148 of the sheet 144, FIG. 2) PE, nylon, EVOH and PE. Both PE layers may be constructed from an ultra low density PE, having a specific gravity of about 0.89. The total thickness of the film may be about 0.0028 inch.

Figure 7:
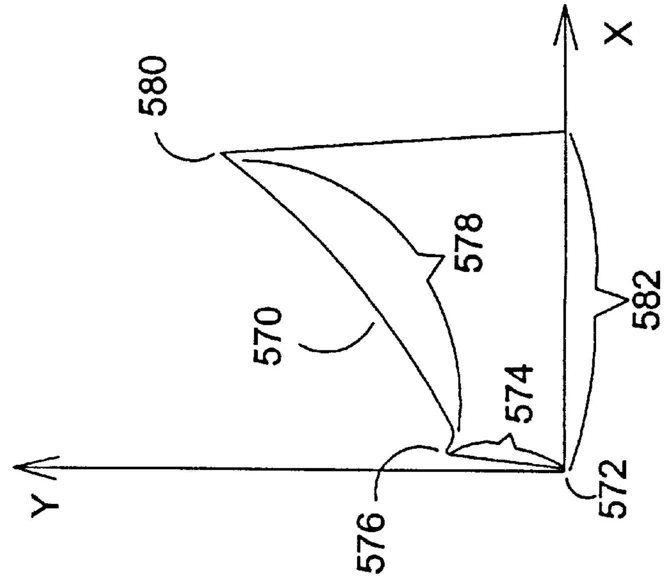
FIG. 7 is a graphical illustration depicting a force-strain diagram for an improved readily deformable pouch outer wall material.

FIG. 7 is a force-strain diagram for the improved readily deformable material described above. To generate the diagram of FIG. 7, a procedure substantially identical to that used to generate FIG. 6 was employed. Specifically, a one inch wide strip of the readily deformable material was placed in the clamps of a conventional tensile testing machine used for testing the strength of materials. The initial gap between the clamps was about 0.375 inch. The clamps were then moved apart at a rate of approximately 12 inches per minute.

FIG. 7 is similar in format to FIG. 6, i.e., strain is measured on the x-axis as a percentage (i.e., the increase in length relative to the initial length of the sample) and force is measured on the y-axis, in a conventional manner. Referring to FIG. 7, the line 570 graphically illustrates the elongation of the improved material in response to tensile force applied. Specifically, at the point 572, zero force is applied and zero elongation is exhibited. As force is applied to the improved material, it begins to deform (i.e., lengthen) through an elastic deformation range 574 until the yield point 576 is reached. As force is applied beyond the yield point 576, the improved material continues to deform through a plastic deformation range 578 until the failure point 580 is reached. The failure point 580 represents the force at which the improved material will completely fail (i.e., rupture or tear). The failure point 580 also represents the ultimate elongation 582 capable of being achieved by the improved material. This ultimate elongation 582 includes elongation which occurs both during the elastic range 574 and during the plastic range 578.

For the improved material described above, it has been found that the yield point 576 occurs at a force of about 9.5 lbs. and an elongation of less than about 5%. The failure point 580 occurs at a force of about 21.5 lbs and an elongation of about 400%. The ultimate elongation 562, thus, is also about 400%. The improved material, thus, is able to elongate or deform about four times as much as the conventional material previously described before failing. This increased ability to elongate or deform allows the pouch 100, formed from the improved material, to closely conform to the interior of the container 500, as illustrated in FIG. 5.

Although a specific improved material has been disclosed, it is noted that alternative films may also be used to achieve the beneficial results described herein. To function properly, such alternative films must be sufficiently deformable, preferably displaying an ultimate elongation of at least about 200% and most preferably of at least about 350%. Such alternative films also must be capable of forming welds, such as the welds 155 previously described, must display adequate barrier properties (i.e., to prevent the contents of the pouch 100 from intermixing with the fluid 510 to be dispensed), must be substantially non-reactive with the fluid 510 housed within the container 500 and must, in the case where the fluid 510 is a beverage, not impose an adverse taste or smell to the fluid 510.

Such alternative films should also be chosen such that the yield point 576, FIG. 7, of the film is greater than the failure point of the intermediate sheet 150, FIG. 2.

Figure 8:
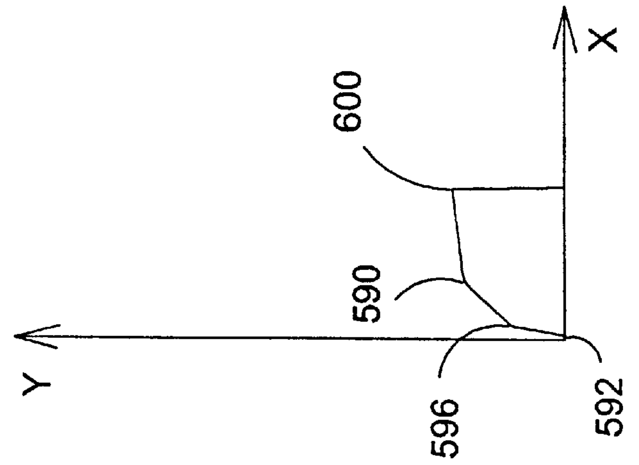
FIG. 8 is a graphical illustration depicting a force-strain diagram for a typical pouch intermediate wall material.

FIG. 8 is a force-strain diagram for a material conventionally used for the intermediate sheet 150 of pressure pouches, e.g., the material disclosed for this purpose in U.S. Pat. No. 5,769,282, previously referenced. To generate the diagram of FIG. 8, a procedure substantially identical to that used to generate FIGS. 6 and 7 was employed. Specifically, a one inch wide strip of the intermediate sheet material was placed in the clamps of a conventional tensile testing machine used for testing the strength of materials. The initial gap between the clamps was about 0.375 inch. The clamps were then moved apart at a rate of approximately 12 inches per minute.

FIG. 8 is similar in format to FIGS. 6 and 7, i.e., strain is measured on the x-axis as a percentage (i.e., the increase in length relative to the initial length of the sample) and force is measured on the y-axis, in a conventional manner. Referring to FIG. 8, the line 590 graphically illustrates the elongation of the typical intermediate sheet material in response to tensile force applied. Specifically, at the point 592, zero force is applied and zero elongation is exhibited. As force is applied to the material, it begins to deform (i.e., lengthen) through an elastic deformation range until the yield point 596 is reached. As force is applied beyond the yield point 596, the material continues to deform through a plastic deformation range until the failure point 600 is reached. The failure point 600 represents the force at which the material will completely fail (i.e., rupture or tear).

As stated previously, for proper operation of the pressure pouch 100, is it important that the force associated with the intermediate sheet failure point 600, FIG. 8, be less than the force associated with the yield point 576 of the improved outer sheet material, FIG. 7. This relationship ensures that the intermediate sheet 150 will fail before the outer sheet enters the plastic deformation range 578, FIG. 7. As an example, with reference to FIG. 2, if the yield point 576, FIG. 7, force of the outer sheets 138, 144 were less than the failure force 600, FIG. 8, of the intermediate sheet 150, then the compartment 110 would continue to expand (due to plastic deformation of the outer sheets 138, 144) without forcing the wall portion 154 (formed from the intermediate sheet 150) to rupture. This expansion of the compartment 110 might continue until the outer sheets 138, 144 reached the failure point 580, FIG. 7, thus resulting in complete failure of the pressure pouch. Alternatively, the wall portion 154 might eventually rupture, but only after an excessive amount of expansion had occurred in the chamber 110, thus resulting in an unacceptable lowering of the pressure of the fluid 510 in the container 500.

For a typical intermediate sheet material, as described above, it has been found that the failure point 600 occurs at a force of about 4 lbs. Accordingly, for the reasons set forth above, it is important for the proper operation of the pressure pouch 100 that the improved outer sheet material be chosen so as to have a yield force 576, FIG. 7, greater than about 4 lbs. Alternatively, the intermediate sheet material may be altered to ensure that the failure point 600, FIG. 8, of the intermediate sheet occurs at a lower force level than the yield point 576, FIG. 7, of the outer sheet material.

It is noted that the force levels (i.e., as measured on the y-axis in FIGS. 6–8) associated with the yield points 556, 576 and the failure points 560, 580, 600 may be impacted by varying the thickness of the sheets involved. The amount of elongation (i.e., as measured on the x-axis in FIGS. 6–8) associated with these points, however, is dictated solely by the composition of the sheets. Accordingly, the composition of the improved material described above is critical to the ability of the improved pouch 100 to fully conform to the interior of the container 500 as illustrated in FIG. 5.

As can be appreciated, in the configuration described above, all of the pouch compartments 110, 112 will open (i.e., all of the divider sections 184 will rupture) before the pouch outer sheets 138, 144 reach the yield. point 576, FIG. 7. Accordingly, all of the divider sections will be ruptured while the outer sheets 138, 144 are exhibiting characteristics within the elastic deformation range 574. As can be seen from FIG. 7, in the elastic deformation range 574, the material of the outer sheets 138, 144 is relatively stiff, i.e., the change in elongation is small relative to the change in force applied. This stiffness facilitates proper rupturing of the divider sections 184, in a manner previously described, by ensuring that sufficient force is transferred to the divider sections.

The outer sheets 138, 144 enter the plastic range 578, FIG. 7, only after all of the pouch compartments 110, 112 are opened (i.e., after all of the divider sections 184 have ruptured). As can be seen from FIG. 7, in the plastic deformation range 578, the material of the outer sheets 138, 144 is relatively flexible (compared to the 35 elastic range 574), i.e., the change in elongation of the material is large relative to the change in force applied. This flexibility allows the pouch to readily deform into the spaces 522, 524, FIG. 4, of the container as previously described. Accordingly, the improved pressure pouch 100 is able to take advantage of both the relatively stiff elastic deformation properties to ensure proper rupturing of the divider walls 184 and the relatively flexible plastic deformation properties to allow the pressure pouch to conform to the container after all of the divider sections 184 have ruptured.

It is noted that the container 500, FIGS. 4 and 5, is illustrated in schematic form only and that the specific shape and dimensions relating to FIGS. 4 and 5 are shown for exemplary purposes only. It is to be understood that the improved readily deformable pressure pouch 100 disclosed herein may advantageously be used with virtually any size or shape of container.

Referring again to FIG. 1, the pouch 100 may be provided with a weld or seam 104 attaching the outer sheets 138, 144 and the intermediate sheet 150 to one another in the area indicated. A compartment 105, e.g., between the outer sheet 138 and the intermediate sheet 150 is, thus, formed between the weld 104 and the weld 136. The compartment 105 may be used to house a tube, not shown, which may, for example, be formed from plastic. When the pouch is inflated within the container 500, as shown, for example, in FIG. 4, this tube will be positioned between the pouch 100 and the container sidewall 502 such that it provides a flow channel between the space 524 and the space 522 and, thus, between the space 524 and the valve member 508. In this manner, the tube prevents the space 524 from being cut off from the valve 508 due to contact (at point 516) between the pouch 100 and the container sidewall 502 and allows fluid contained within the space 524 to reach the valve 508 and be dispensed from the container 500.

As an alternative to the seam 104 and tube described above, the pouch 100 may be folded, in the general area of the seam 104, FIG. 1, and along an axis generally parallel to the length of the seam 104, in order to provide a flow channel.

Figure 9:
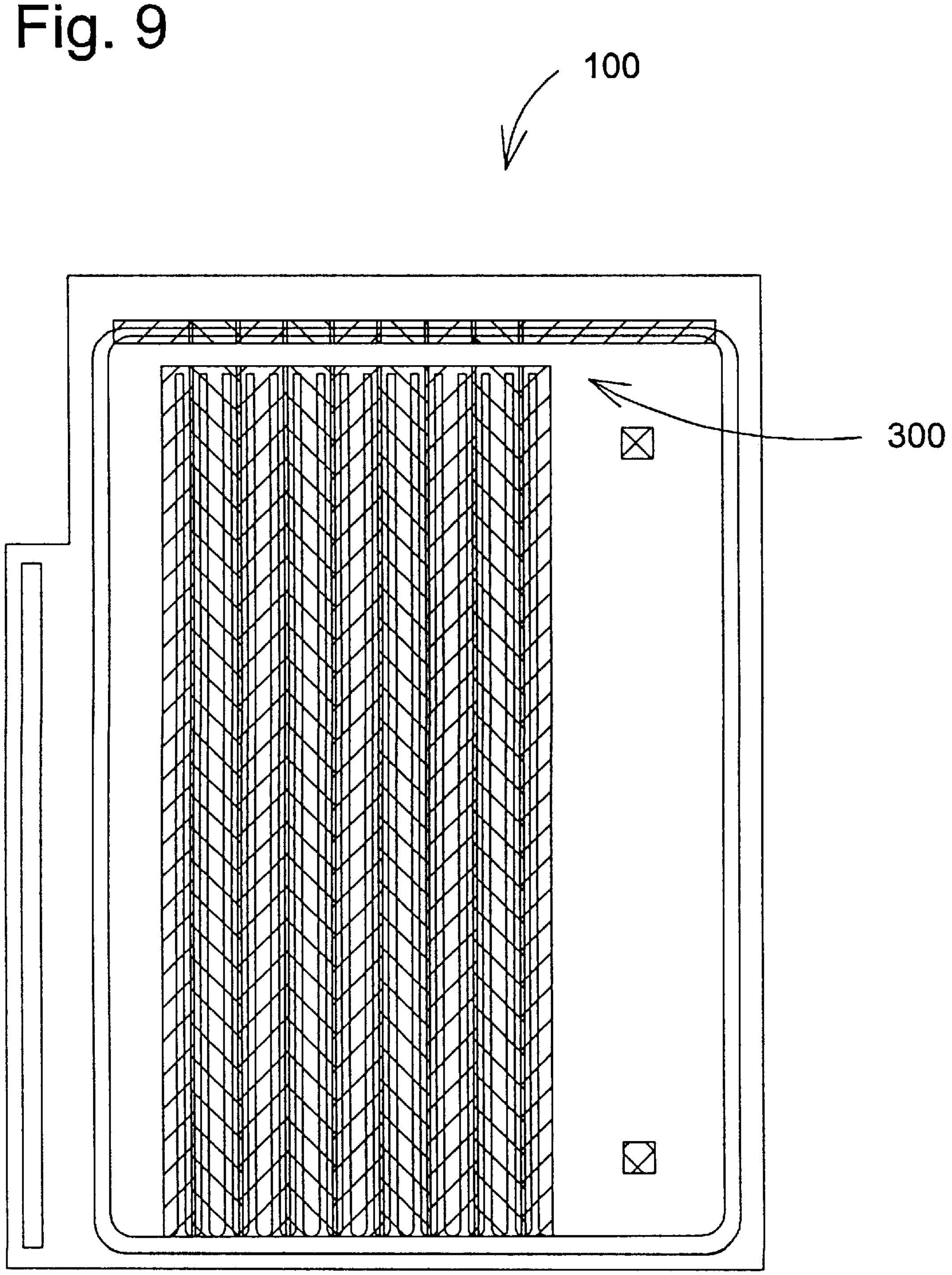
FIG. 9 is view similar to FIG. 1 but showing the pressure pouch before final seaming has occurred and showing an ink pattern which may be used in conjunction with the pressure pouch.
Figure 10:
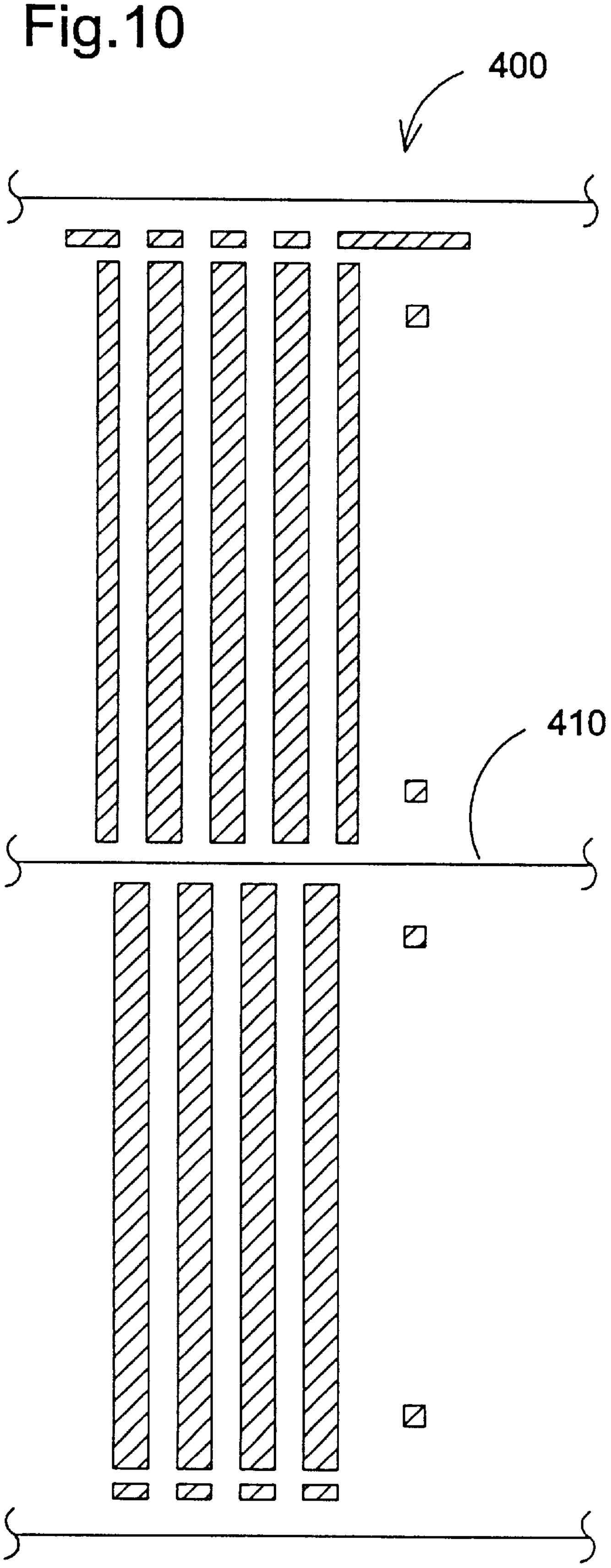
FIG. 10 is a top plan view of a web of material from which the pouch of FIGS. 1 and 9 may be manufactured.

FIG. 9 is view similar to FIG. 1 but showing the pressure pouch 100 before final seaming has occurred and showing an ink pattern 300 which may be used in conjunction with the pressure pouch in a similar manner to that described in U.S. Pat. No. 5,769,282, previously referenced. FIG. 10 is a top plan view of a web of material 400 from which the pouch 100 may be manufactured, showing the ink pattern 300 before the web 400 is folded along the line 410.

The foregoing description has been made with reference to a pressure pouch of the type having rupturable divider walls, e.g., the type disclosed in U.S. Pat. No. 5,769,282, previously referenced. It is noted, however, that the improved readily deformable pressure pouch film could be used in conjunction with other types of pressure pouches such as pressure pouches using peelable seams, e.g., the types disclosed in U.S. Pat. Nos. 4,785,972; 4,919,310; 4,923,095 and 5,333,763, previously referenced. When used in such peelable seam type pouches, the readily deformable sheet material should be chosen such that its yield force 576, FIG. 7, is greater than the force required to peel the seams of the pouch, for the reasons previously set forth.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A pressure pouch suited for use with a dispensing container, said pressure pouch comprising:

at least one sheet formed from a first flexible material;

at least first and second compartments;

at least one divider wall located between said at least first and second compartments;

wherein said first flexible material is capable of elongating in response to tensile force applied thereto;

wherein, in response to applied tensile force, said first flexible material reaches a first flexible material ultimate elongation at which point said first flexible material fails; and wherein said first flexible material ultimate elongation is at least about 200%.

2. The pressure pouch of claim 1 wherein said first flexible material ultimate elongation is at least about 350%.

3. The pressure pouch of claim 1 wherein said first flexible material ultimate elongation is about 400%.

4. The pressure pouch of claim 1:

wherein, in response to a level of force, said at least one divider wall is capable of opening to establish fluid communication between said at least first and second compartments;

wherein said first flexible material ultimate elongation includes an elastic deformation range and a plastic deformation range, separated by a first flexible material yield point;

wherein said level of force is less than said first flexible material yield point.

5. The pressure pouch of claim 4 wherein said at least one divider wall comprises a peelable seam.

6. The pressure pouch of claim 4 wherein said at least one divider wall comprises a frangible divider wall.

7. The pressure pouch of claim 1:

wherein said at least one sheet comprises a first outer sheet and a second outer sheet; and further comprising an intermediate sheet formed from a second flexible material, said intermediate sheet located between at least portions of said first and second outer sheets.

8. The pressure pouch of claim 7:

wherein said second flexible material is capable of elongating in response to tensile force applied thereto;

wherein, in response to applied tensile force, said second flexible material reaches a second flexible material ultimate elongation at which point said second flexible material fails;

wherein said first flexible material ultimate elongation includes an elastic deformation range and a plastic deformation range, separated by a first flexible material yield point;

wherein said second flexible material ultimate elongation is less than said first flexible material yield point.

9. The pressure pouch of claim 7 wherein:

said pressure pouch comprises at least first and second compartments;

said first outer sheet includes an outer surface and an oppositely disposed inner surface;

said second outer sheet includes an outer surface and an oppositely disposed inner surface;

said intermediate sheet is sealed to said first outer sheet inner surface at a first location and to said second outer sheet inner surface at a second location;

said intermediate sheet forms a first divider wall portion located between said first location and said second location; and said first divider wall portion forms a common wall between said at least first and second compartments.

10. The pressure pouch of claim 1, wherein said pressure pouch further includes a flow channel.

11. A method of dispensing fluid from a container by applying pressure to said fluid with a pressure pouch disposed within said container, said pressure pouch having a plurality of compartments therewithin, said method comprising:

establishing fluid communication between said plurality of compartments as said fluid is dispensed from said container;

plastically expanding said pressure pouch after all of said plurality of compartments are in fluid communication with each other.

12. The method of claim 11 wherein said plastically expanding comprises plastically expanding said pressure pouch until it substantially conforms to the interior configuration of said container, thereby enabling substantially all of said fluid to be dispensed from said container.

13. The method of claim 11 wherein said pressure pouch comprises at least one sheet formed from a first flexible material and said plastically expanding comprises expanding said at least one sheet in a plastic deformation range of said first flexible material.

14. The method of claim 11 wherein said plurality of compartments contain first and second components of an at least two-component gas generating system and said establishing fluid communication comprises mixing at least portions of said first and second components.

15. The method of claim 11 wherein said plurality of compartments are initially separated by a plurality of divider walls.

16. The method of claim 15 wherein said plurality of divider walls are frangible divider walls.

17. The method of claim 16 wherein said establishing fluid communication comprises rupturing said frangible divider walls.

18. The method of claim 15 wherein said plurality of divider walls comprise peelable seams.

19. The method of claim 18 wherein said establishing fluid communication comprises peeling said peelable seams.

20. The method of claim 11 wherein said pressure pouch includes:

at least one sheet formed from a first flexible material;

wherein said first flexible material is capable of elongating in response to tensile force applied thereto;

wherein, in response to applied tensile force, said first flexible material reaches a first flexible material ultimate elongation at which point said first flexible material fails;

wherein said first flexible material ultimate elongation is at least about 200%.

21. The method of claim 11 wherein said plastically expanding said pressure pouch after all of said plurality of compartments are in fluid communication with each other comprises plastically expanding said pressure pouch only after all of said plurality of compartments are in fluid communication with each other.

* * * * *